Oct. 11, 1949.    O. R. SCHOENROCK    2,484,652
SICKLE GUARD
Filed June 9, 1945    3 Sheets-Sheet 1
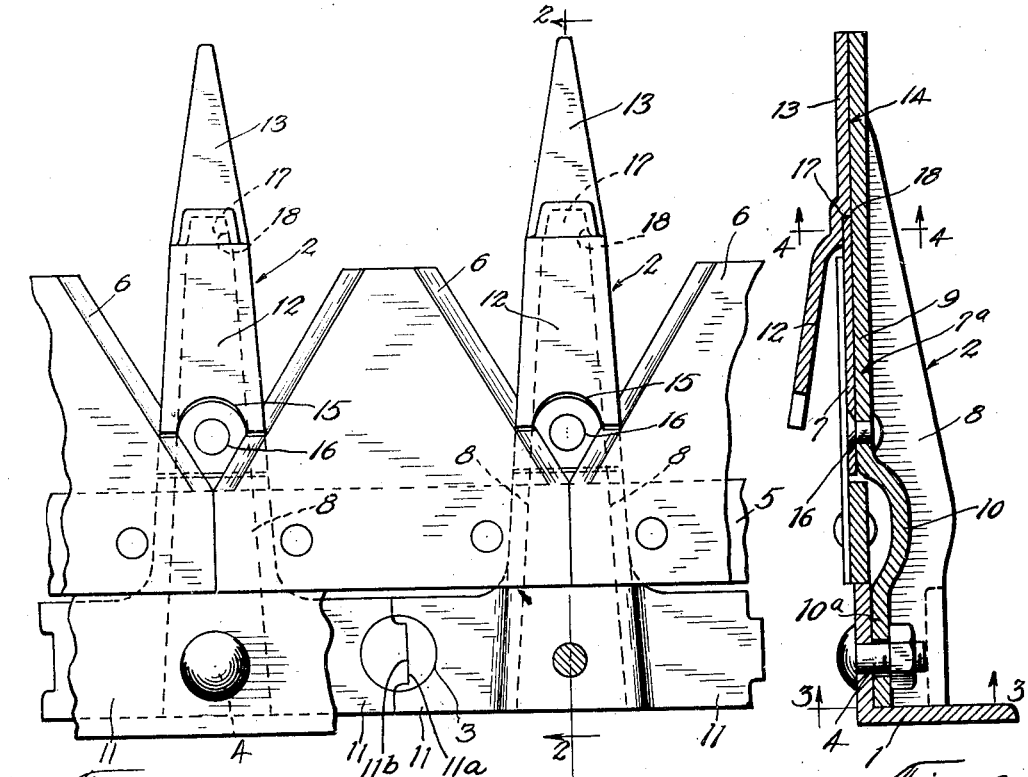
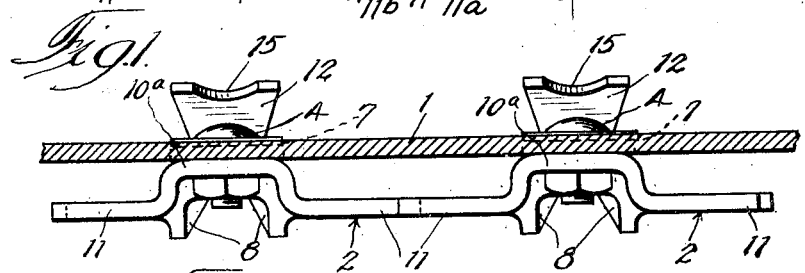
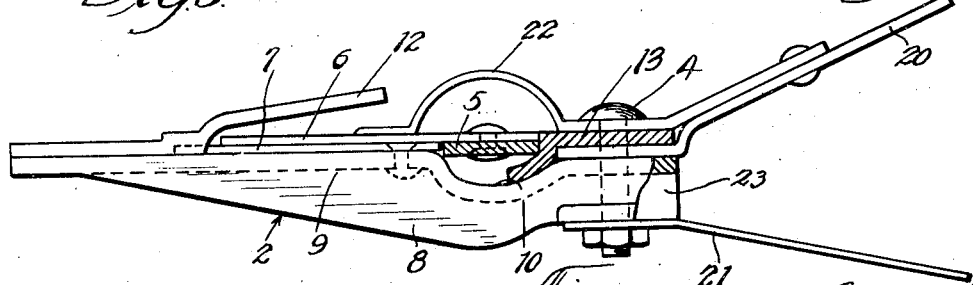
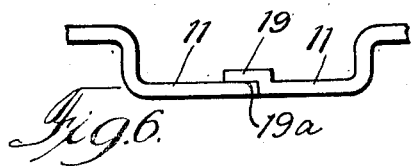
Inventor
Otto R. Schoenrock
By Thiess, Olson & Mecklenburger
Attys.

Oct. 11, 1949.   O. R. SCHOENROCK   2,484,652
SICKLE GUARD
Filed June 9, 1945   3 Sheets-Sheet 2
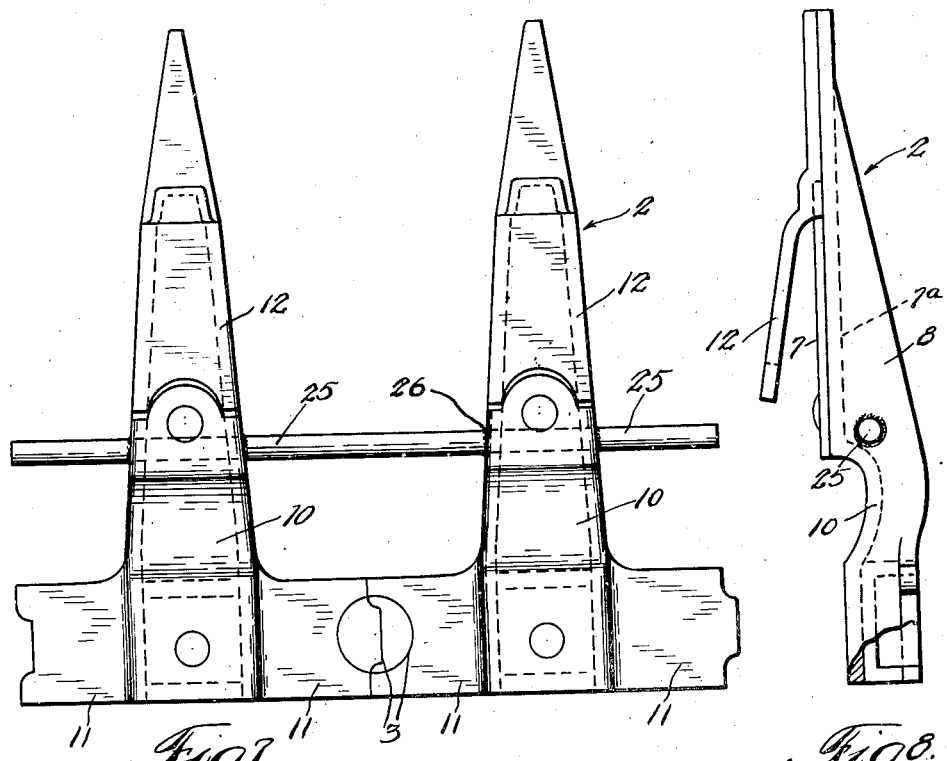
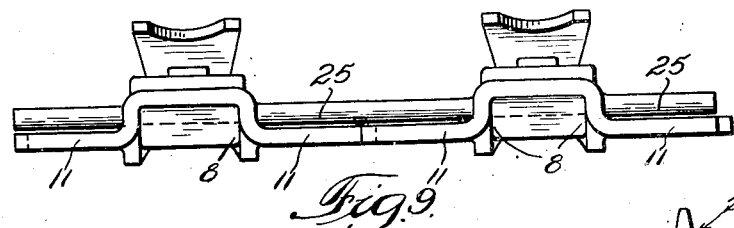
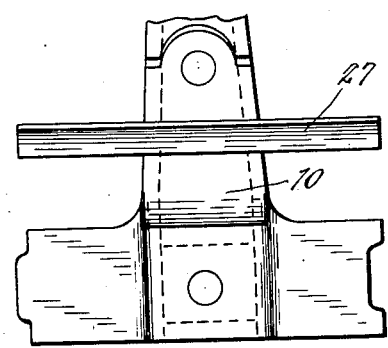

Oct. 11, 1949.   O. R. SCHOENROCK   2,484,652
SICKLE GUARD
Filed June 9, 1945   3 Sheets-Sheet 3
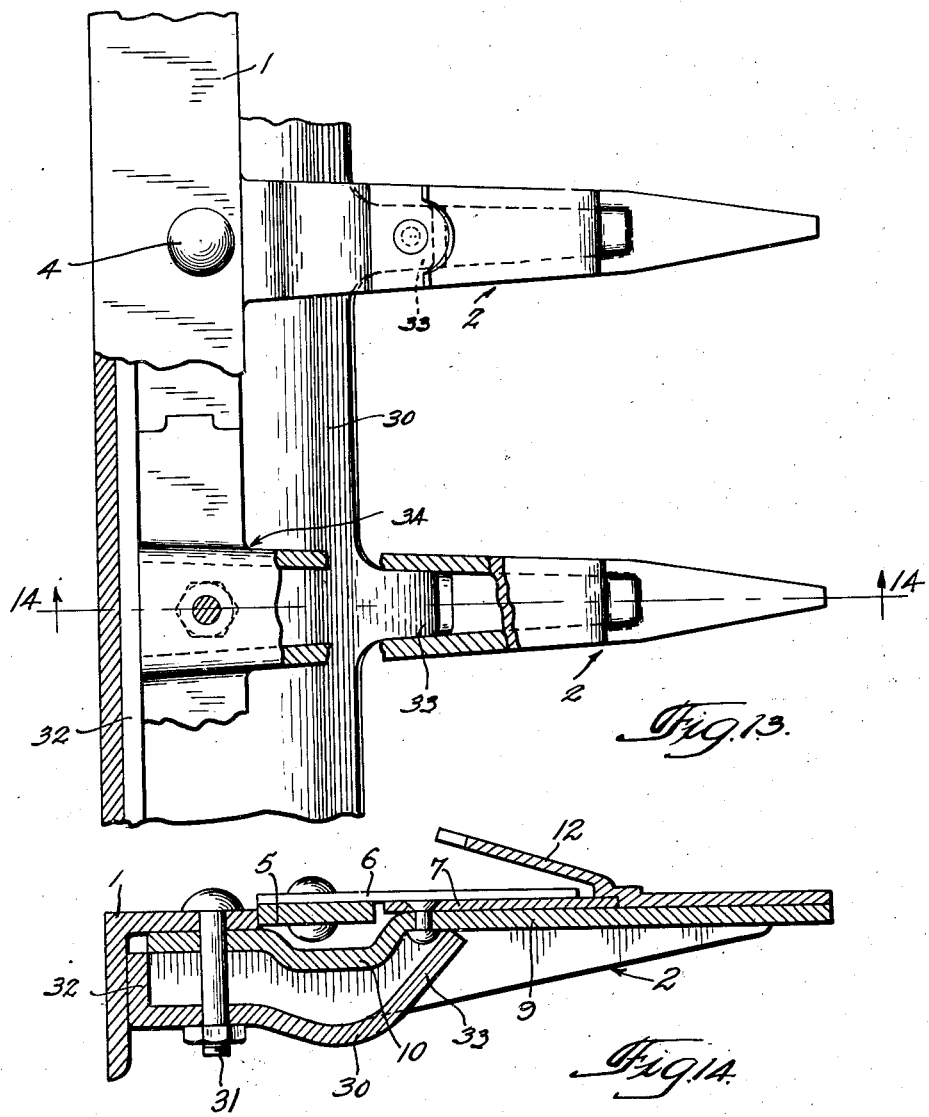
Inventor:
Otto R. Schoenrock
By Thiess, Olsen & Mecklenburg
Attys Patented Oct. 11, 1949

2,484,652

UNITED STATES PATENT OFFICE 2,484,652

SICKLE GUARD

Otto R. Schoenrock, Oak Park, Ill., assignor to J. I. Case Company, Racine, Wis., a corporation of Wisconsin Application June 9, 1945, Serial No. 598,594

8 Claims. (Cl. 56—309)

My invention relates to sickle guards.

One of the objects of my invention is to provide an improved sickle guard formed of shaped sheet metal.

A further object is to provide a sickle guard formed of shaped sheet metal designed so as not to collect dirt and trash.

A further object is to provide a formed sheet metal sickle guard which will provide a firm support for the ledger plate.

A further object is to provide a unit comprising several sheet metal sickle guards having lateral ears welded together to provide a wide stiff base which can be secured to the sickle bar at spaced points to prevent deflection of the guards when mounted on the bar.

Further objects and advantages of the invention will be apparent from the description and claims.

In the drawings, in which my invention is illustrated,

Figure 1 is a plan view showing a pair of sickle guards and part of the sickle;

Fig. 2 is a section on the line 2—2 of Fig. 1;

Fig. 3 is a section on the line 3—3 of Fig. 2;

Fig. 4 is a section on the line 4—4 of Fig. 2;

Fig. 5 is an elevational view showing a somewhat different mounting for the sickle guard;

Fig. 6 is a fragmentary elevational view showing a modification of the connection between the guards;

Fig. 7 is a plan view showing another form of guard;

Fig. 8 is a side elevational view of Fig. 7;

Fig. 9 is a rear elevational view of Fig. 7;

Fig. 10 is a fragmentary plan view showing another form of sickle guard;

Fig. 11 is a side elevational view of Fig. 10;

Fig. 12 is a reduced plan view showing another form of sickle guard construction;

Fig. 13 is a plan view showing another form; and

Fig. 14 is a section on the line 14—14 of Fig. 13.

Referring to the drawings in detail, the construction shown in Figs. 1–4, incl., comprises a supporting bar 1, shown as an angle iron, which extends the length of the sickle, a plurality of sickle guards 2 welded together in pairs at 3 and secured to the supporting bar by means of bolts 4, a sickle including the sickle bar 5 and the sickle sections 6 mounted for reciprocation with respect to the sickle guards 2, and ledger plates 7 mounted on the sickle guards having cutting edges co-operating with the cutting edges of the sickle sections.

The sickle guard 2 is of shaped sheet metal, stamped or drawn to provide an inverted channel-like portion having an upper medial web portion 7a and two elongated flanges 8 extending downwardly from the opposite side edges of the web, the web 7a having a flat portion 9 to which the ledger plate 7 is secured, a depressed portion 10 in the rear of the flat portion 9 bent down to form a transverse channel for the bar 5 on which the sickle sections are mounted, and a flat portion 10a in the rear of the depressed portion 10 having an opening to receive the securing bolt 4. Each of the downwardly extending side flanges is provided with a laterally extending ear 11 for positioning it with respect to an adjacent section. The guards are secured together in pairs by spot-welding together the laterally extending ears 11 at 3. This makes the pair of guards in effect integral and prevents racking, twisting or deflection of the guards about the bolts 4 on the bar 1 on which they are mounted. One of the laterally extending ears 11 is provided with a wide notch 11a into which fits a wide tongue 11b on the adjacent lug of the adjacent section. When the sections are spot-welded together, a generally circular welded bond is provided between the meeting surfaces of the notch and tongue, as indicated at 3 (Fig. 1). The shortest distance between the edges of the flanges 8 in any section normal to the web portion 7a may be at least as great as the shortest distance between these flanges at any other point in the same section nearer to the web portion.

A guard plate 12, which also may be of formed sheet metal, has a front tapering portion 13 which may be spot-welded at 14 to overlie the tapering front portion of the front end of the sickle guard. This guard plate extends rearwardly over the sickle sections 6 and ledger plate 7 to hold the stalks of grain in proper shearing position. The rear end of the guard plate 12 may be recessed at 15 to enable insertion of the fastening rivet 16 which secures the ledger plate 7 to the guard. The front end 17 of the ledger plate is tucked into a central recess 18 formed in the guard plate 12 which, together with the guard, provides a pocket for the reduced extension of the front end of the ledger plate. It will be seen that the upper surface of the guard finger has no upwardly opening pockets to catch dust, trash, or the like.

Fig. 6 shows a modified form of welded connection between the guards. In Fig. 6 the end portion 19 of the laterally extending ear 11 of one guard is offset upwardly to provide an angular recess into which the adjacent end of the ear 11 of the adjacent guard fits, the overlapping end portions of the two guards being spot-welded together at 19a.

The construction shown in Fig. 5 is similar to that just described. In this form, the sickle guards 2 are clamped between the usual hold-down cover 20 and the cutter bar rail 21 by means of bolts 4. This also shows the sickle hold-down clip 22 for holding the sickle sections 6 in proper position with respect to the ledger plates 7. Otherwise, the construction is substantially like that shown in Figs. 1-4, inclusive.

The supporting bar 13 of Fig. 5 has a downwardly and forwardly extending flange 13a fitting the depressed portion 10 of the guard. A filler block 23 may be provided between the cover 20 and the cutter bar rail 21 fitting between the flanges 8. The bolt 4 extends through the hold-down cover, the filler block 23 and the cutter bar rail 21.

The construction shown in Figs. 7, 8 and 9 is similar to that shown in Figs. 1-6, incl. The stamped sickle guard 2 having the medial web portion 7a and the flanges 8, the ledge plate 7, the depressed portion 10, the laterally extending ears 11 and the guard plate 12 may be similar to those in Figs. 1, 2 and 3. In this form additional bracing and spacing means are provided in the form of rods or bars 25 inserted through aligned openings in the flanges 8 and welded or otherwise secured thereto as indicated at 26. This construction adds to the ruggedness of the construction and tends to hold the guards in alignment.

The construction shown in Figs. 10 and 11 is substantially like that shown in Figs. 7, 8 and 9, except that a bar 27 of arcuate cross section is substituted for the round bar 25 shown in Figs. 7, 8 and 9. This arcuate bar may be spot welded or otherwise suitably secured to the depressed portion 10 of the guard.

Fig. 12 shows a construction in which two guard sections 2 are formed integrally from sheet metal to provide a duplex guard 28 in which the connecting flange 11a is integral with the side flanges 8 and in which a reinforcing rod 29 extends between the guard sections and is secured to the flanges 8 thereof by welding at 26 or in any suitable manner.

Figs. 13 and 14 show a construction in which additional means are provided to prevent lateral distortion and twisting of the guards. This is accomplished by means of an additional reinforcing piece in the form of an upwardly open shallow channel member 30 arranged beneath the supporting bar 1 and also beneath several of the guards. This channel 30 is held in place by bolts 31 which are somewhat longer than the bolts 4 of the previous construction. This channel 30 has a rear upwardly extending flange 32 which engages the rear ends of the guards 2, positioning them slightly forward in relation to the downwardly extending flange of the supporting bar 1. This channel 30 has upwardly and forwardly extending fingers 33 which extend between the flanges 8, 8 of the guards and are so proportioned as to have a tight fit therebetween. These fingers 33 support the guards 2 at a point spaced well in front of the bolts 31 against the lateral deflection caused by the alternating movement of the sickle. This avoids undue stress at the junction of the forwardly extending portion of the sickle guard with the laterally extending portion. The channel 30 is long enough so as to reinforce at least two of the guards and might extend the full length of the cutter bar and have enough fingers to engage all of the guards.

Further modifications will be apparent to those skilled in the art and it is desired, therefore, that the invention be limited only by the scope of the appended claims.

Having thus described my invention, what I claim and desire to secure by Letters Patent is:

1. A sickle guard construction comprising a supporting bar, a sheet metal sickle guard having an inverted channel portion comprising an elongated upper medial web portion and two elongated flanges extending downwardly from the opposite sides of said upper web portion, a sheet metal brace extending underneath the rear end of said sickle guard bearing on said flanges and having a positioning lug extending upwardly between said flanges to hinder lateral movement of said flanges, and means for securing said supporting bar, guard and brace together.

2. A sickle guard construction comprising a supporting bar, a plurality of sheet metal sickle guards, each having an inverted channel portion comprising an upper medial web portion and two elongated flanges extending downwardly from the opposite sides of said upper web portion, a sheet metal brace extending underneath the rear ends of said sickle guards bearing on said flanges and having a plurality of positioning lugs, one for each guard, extending upwardly between the flanges of the guard to hinder lateral movement of the flanges, and means for securing said supporting bar, guards and brace together.

3. A sickle guard construction comprising a supporting bar, a sheet metal sickle guard having an inverted channel portion comprising an elongated upper medial web portion and two elongated flanges extending downwardly from the opposite sides of said upper web portion, a sheet metal brace extending underneath the rear end of said sickle guard bearing on said flanges and having a positioning lug extending upwardly between said flanges to hinder lateral movement of said flanges, and means for securing said supporting bar, guard and brace together, comprising a bolt extending through the supporting bar, guard and brace.

4. A sickle guard construction comprising a supporting bar, a sheet metal sickle guard having an inverted channel portion comprising an elongated upper medial web portion and two elongated flanges extending downward from the opposite sides of said upper web portion, a sheet metal brace extending underneath the rear end of said sickle guard bearing on said flanges and having means engaging said flanges to hinder lateral movement of said flanges, and means for securing said supporting bar, guard and brace together.

5. A sickle guard construction comprising a supporting bar, a sheet metal sickle guard having an inverted channel portion comprising an elongated upper medial web portion and two elongated flanges extending downward from the opposite sides of said upper web portion, a sheet metal brace connected with said flanges, extending laterally thereof and engaging said supporting bar to hinder lateral movement of said flanges, and means for securing said supporting bar, guard and brace together.

6. A stamped sheet metal sickle guard, to be secured to a guard supporting bar for use with a sickle bar and sickle sections, having a channel portion comprising an elongated ledger plate receiving web portion and two elongated ground engageable flanges extending from the opposite sides of said web portion respectively, the length of any line of any transverse section normal to said web portion, and parallel to said web portion being as great as the length of any other such line lying closer to said web portion whereby the guard may be formed by stamping operation, said flanges converging toward a point and tapering toward a point, a plan view of said web portion comprising a forwardly directed finger portion, said web portion and flange construction extending in a direction away from said point and across at least a portion of said guard supporting bar.

7. A stamped sheet metal sickle guard, to be secured to a guard supporting bar for use with a sickle bar and sickle sections, having a channel portion comprising an elongated ledger plate receiving web portion and two elongated ground engageable flanges extending from the opposite sides of said web portion respectively, the shortest distance between the edges of the flanges in any section normal to said web portion being at least as great as the shortest distance between said flanges at any other point in the same section nearer to said web portion, whereby the guard may be formed by stamping operation, said flanges converging toward a point and tapering toward a point, a plan view of said web portion comprising a forwardly directed finger portion, said web portion and flange construction extending in a direction away from said point and across at least a portion of said guard supporting bar.

8. A stamped sheet metal sickle guard to be secured to a guard supporting bar for use with a sickle bar and sickle sections, said guard having a channel portion comprising an elongated web portion providing a ledger plate receiving part and a guard bar attachable part, and two elongated ground engageable flanges extending from the opposite sides of said web portion respectively, the shortest distance between the edges of the flanges in any section normal to said ledger plate receiving part being at least as great as the shortest distance between said flanges at any other point in the same section nearer to said ledger plate receiving part, whereby the guard may be formed by stamping operation, said flanges converging toward a point and tapering toward a point, a plan view of said web portion comprising a forwardly directed finger portion, said web portion and flange construction extending in a direction away from said point and across at least a portion of said guard supporting bar, and said web portion having an offset sickle bar receiving recess disposed between said ledger plate receiving part and said guard bar attachable part.

OTTO R. SCHOENROCK.

REFERENCES CITED

The following references are of record in the file of this patent:

UNITED STATES PATENTS

| Number | Name | Date |
|---|---|---|
| 471,560 | Lydon et al. | Mar. 29, 1892 |
| 782,296 | Webber | Feb. 14, 1905 |
| 1,726,378 | Barber | Aug. 27, 1929 |
| 2,152,265 | Matthews | Mar. 28, 1939 |

FOREIGN PATENTS

| Number | Country | Date |
|---|---|---|
| 18,464 | Great Britain | Sept. 16, 1901 |